D. Manuel,

Bed Bottom.

No. 3311. Reissued Feb. 23. 1869.

Witnesses:
Theo. Tusche
Wm. Truran

Inventor:
D. Manuel
Per Munn & Co.
Attorneys

N. PETERS, PHOTO-LITHOGRAPHER, WASHINGTON, D. C.

United States Patent Office.

JOHN S. PAINE, OF BOSTON, MASSACHUSETTS, ASSIGNEE, BY MESNE ASSIGNMENTS, OF DAVID MANUEL.

*Letters Patent No.* 63,066, *dated March* 19, 1867; *reissue No.* 3,311, *dated February* 23, 1869.

IMPROVED BED-BOTTOM.

The Schedule referred to in these Letters Patent and making part of the same.

*To all persons to whom these presents may come:*

Whereas, Letters Patent No. 63,066, dated March 19, A. D. 1867, were granted to DAVID and WILLARD MANUEL, of Boston, of the county of Suffolk, and State of Massachusetts, (assignees of DAVID MANUEL,) for an Improved Bed-Bottom; and whereas, by an instrument in writing, bearing date the 28th day of November, A. D. 1868, and duly recorded in the books of the United States Patent Office, all the right, title, and interest of the said DAVID and WILLARD MANUEL, or exclusive property, covered by such Letters Patent, have been sold, assigned, and conveyed to me, JOHN S. PAINE, of said Boston; and whereas I have reason to believe the said Letters Patent to be inoperative and invalid, by reason of a defective or insufficient specification, or description and claim, and in accordance with law, in such cases provided, I have applied for leave to surrender such Letters Patent for reissue; now, therefore, I do hereby declare the following, in connection with the accompanying drawings, to be a full, clear, and exact description of the said invention.

Of such drawings—

Figure 1 denotes a vertical and longitudinal section of such bed-bottom, such section being taken through one of the slats thereof.

Figure 1:
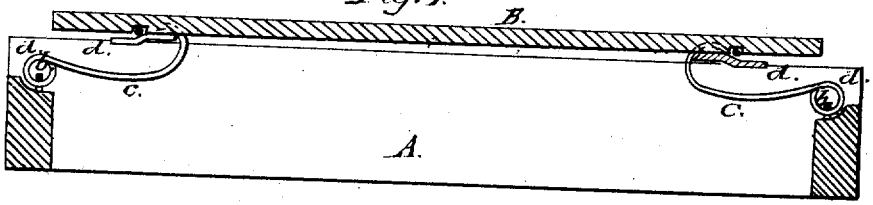
Figure 2:
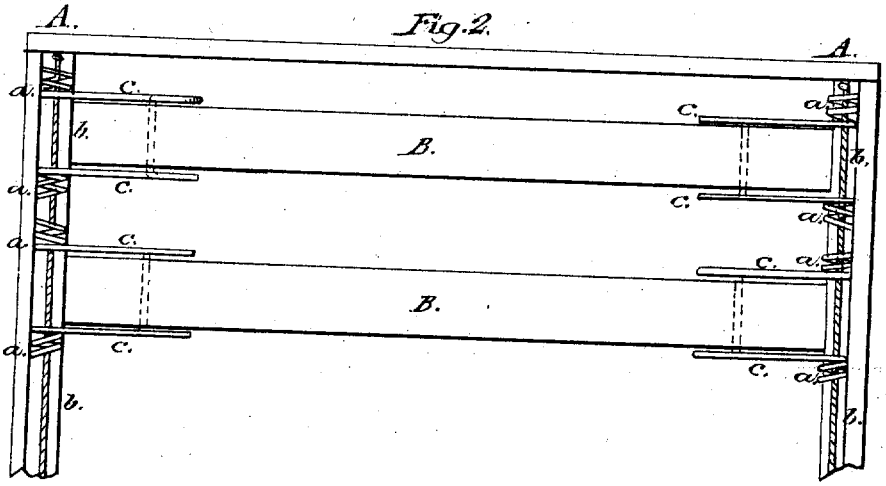
Figure 2 is a top view of it in part.
Figure 3:
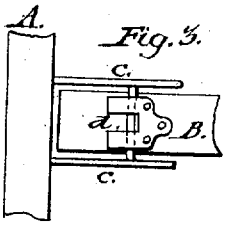
Figure 3 is a view representing the under side of an end portion of one of the slats, with its spring, and the holder, or overlap, and a portion of the supporting-frame of the slat.

Each part of the bed-bottom, as indicated in the different figures, bears its distinguishing letter.

The drawings represent a bed-bottom, composed of a supporting or foundation-frame, A, a series of slats, B, and a series of springs, C.

In the abstract, such a combination is old, and not claimed as the invention of the said DAVID MANUEL, his invention consisting of an improvement or improvements thereon, or one or more additions whereby the parts or constituents are advantageously adapted to each other, and sustained.

Each of the springs C is a compound one, made usually of a single wire, bent in manner as represented in the drawings; that is to say, the wire, near its middle, is bent twice at right angles, with a straight portion, *e*, between the bends; thence, each leg is bent in the form of a C-spring, as shown at *f*, from whence it is bent in a long curve, or side-spring, as shown at *c*.

Next, it is coiled in a helix, as shown at *a*, and terminates in a point, or straight portion, or prong *g*, which projects downward from the helix, and about at a right angle with the part *c*, the whole being as shown in the drawings.

The addition of the two C-springs, or portions *f f*, to the remaining portions of the spring, renders it specially advantageous; that is to say, when resting on the connection-part *e*, the slat comes directly between the two curved springs or portions *f f*, which embrace its opposite edges, and thus serve as supports to prevent lateral sway of the slat.

Besides this, these additional parts, *f f*, materially increase the elastic character of the spring, and serve to elevate the slat so much above the parts *c c*, as to prevent the bed or mattress from catching or going between the slat and such parts *c c*.

The frame A has each of its head and foot cross-bars *k l* recessed or grooved, as shown at *m*, to receive and support the helix-coils of the springs, the points or prongs of each of the springs resting on either cross-bar, being inserted in holes bored down in the bar. The groove of each bar sustains the helix-coils during lateral motion of the rest of the spring. Were the coils to rest on a flat surface, the prongs alone would have to resist the lateral strains on the spring, but when the coils rest in a groove, they will be supported so as to relieve the prongs from the lateral torsion-strains, tending to loosen them in their holes, or to break them.

The downward pressure of a weight, when on the slats, produces such a leverage on the springs as tends to draw the prongs out of their holes, or loosen them therein, so as to render the springs liable to rise, or be thrown up out of place, on the supporting-frame. In order to keep them in place, under such circumstances, cords *b b*, or equivalents, are employed, each of such cords being run through the helix-coils of one of the series of springs. The cord, after having been drawn taut, is fastened at its two ends to the supporting-frame. The cord thus serves to keep the springs from being thrown out of place by any means, especially when the bed-bottom may be turned over or upside down.

Each slat, where resting on a spring, is notched to receive the spring, and is provided with a hook or overlap, *d*, which is fastened to or extended from the slat, so as to hold it in connection with or in place on the part *e* of the spring. This overlap prevents disconnection of the slat and spring, when the bed-foundation is turned up or over.

By the construction of each of the springs, its action becomes peculiar, the curved parts *c c* first yielding to downward pressure exerted on the slat, after which, there are obtained the combined actions of the C-springs and the helix-coils.

The C-springs, besides affording lateral support to the slats, so elevate it with respect to the long springs or portions *c c*, as to keep them out of contact with and from wearing a bed or mattress when on the slats and in use.

It is not herein pretended to claim, as the invention of the said DAVID MANUEL, a spring made without the C-springs extending from its slat-rest, but simply of the two helix-coils, their prongs, the parts *c c*, and the slat-rest, as this is an old method of making a spring. The addition thereto of the C-springs, or parts *f f*, makes a new or compound spring of more utility and advantage.

Having thus described the improved spring-bed foundation of the said DAVID MANUEL,

What is claimed as of his invention therein is as follows:

The compound wire spring, constructed substantially as described, viz, of the C-springs or bends *f f*, the connection or slat-rest *e*, the side-springs or parts *c c*, and the helix-coils *u*, and their prongs *g*, arranged substantially as set forth.

Also, the arrangement of the compound wire springs, having spiral ends *a a* attached to the frame of the bedstead A, and held by the cords *b b*, and having, also, long curved sides *c c*, connected with the slats B by the overlap *d*, formed, combined, and operating substantially as and for the purposes herein described.

Also, the arrangement of each of the springs C with the slat, so as to embrace it on its opposite edges, and extend below and from it, as specified.

Also, the combination of the overlaps *d d* with the slat and its springs, arranged and applied together, and to a supporting-frame, as specified.

JOHN S. PAINE.

Witnesses:
J. R. SNOW,
F. P. HALE, Jr.